Patented July 4, 1950

2,514,199

UNITED STATES PATENT OFFICE 2,514,199

STANNOUS CATECHOLATE

George E. P. Smith, Jr., Akron, Ohio, assignor to The Firestone Tire & Rubber Company, Akron, Ohio, a corporation of Ohio No Drawing. Application August 6, 1947, Serial No. 766,879

1 Claim. (Cl. 260—429)

This invention relates to the new chemical compound, stannous catecholate. The compound is of value as a stabilizer for various chemical products, such as rubber-like copolymers of butadiene and styrene, etc.

The following examples illustrate the preparation of the compound:

Example 1

Two hundred grams of catechol (1.8 mole) were dissolved in 600 milliliters of water; 410 grams of stannous chloride dihydrate (1.8 mole) were dissolved in 900 milliliters of water and added to the first solution. A concentrated aqueous solution of 145 grams of sodium hydroxide (3.6 moles) was dropped in with stirring. The first brownish precipitate was discarded. The light colored precipitate, separating as more alkali was added, was filtered off and dried in air at 30 to 40° C. Yield 330 grams. The substance is nearly insoluble in acetone and isopropyl acetate, slightly soluble in alcohol, glycol, iso-butyl alcohol, soluble in aqueous sodium hydroxide, in hot acetic and formic acids, and in hot formamide.

Analysis: Calc. for $C_6H_4O_2Sn$, Sn 52.34 per cent. Found 50.7 per cent (micro gravimetric).

Product recrystallized from glacial acetic acid: Calc. for $C_6H_4O_2Sn$, Sn 52.34 per cent; $C_6H_6O_3Sn$, 48.52 per cent. Found 47.7 per cent (micro gravimetric).

Example 2

Seven and five-tenths kilograms of catechol (68 moles) were dissolved in 23 liters of water; 13 kilograms of stannous chloride (68 moles) were added to the catechol solution. Five and five-tenths kilograms of sodium hydroxide (137 moles) were dissolved in 16 liters of water and run slowly into the first solution with stirring and cooling to a temperature of 40 to 42° C. The product was filtered with suction, washed with water, and oven dried. Yield 15.4 kilograms.

Analysis: Calc. for $C_6H_4O_2Sn$, Sn 52.34 per cent. Found 51.20 (micro gravimetric).

Example 3

Ten grams of catechol (0.091 mole) were dissolved in an aqueous solution of 7.3 grams of sodium hydroxide (0.182 mole). Seventeen and three-tenths grams of stannous chloride (0.091 mole) were dissolved in water and added to the first solution. The resulting slurry was acidified with acetic acid and the product filtered off and dried. Yield 20.3 grams.

Analysis: Calc. for $C_6H_4O_2Sn$, Sn 52.34 per cent. Found 51.75 (micro gravimetric).

The compound referred to herein as catechol is o-dihydroxybenzene. It is sometimes called pyrocatechin. The stannous compounds are referred to herein as salts because it is believed that they are true neutral salts. They may be hydrated. One reason for believing that they are salts and not chelates is that they may be formed by different methods.

The method of making stannous catecholate by rendering alkaline a solution of catechol and the stannous salt of a weak acid is claimed in Smith Serial No. 28,728.

What I claim is:

Stannous catecholate.

GEORGE E. P. SMITH, Jr.

REFERENCES CITED

The following references are of record in the file of this patent:

UNITED STATES PATENTS

| Number | Name | Date |
|---|---|---|
| 2,310,449 | Lightbown et al. | Feb. 9, 1943 |
| 2,445,727 | Kinzinger | July 20, 1948 |

OTHER REFERENCES

Weinland et al., "Zeit, anorg. allgem. Chem.," vol. 150 (1926), page 79.

Beilstein, "Handbuch der Org. Chem.," vol. VI, 4th ed. 1923, page 767.